Figure 1:
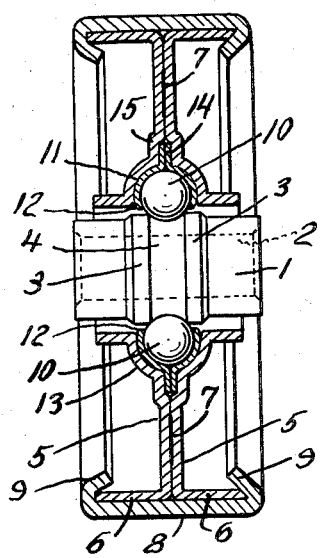

Feb. 16, 1937.　　　J. E. MARSHALL　　　2,071,080
ROLLER
Filed Feb. 28, 1935

INVENTOR
James E. Marshall
BY
ATTORNEYS

Patented Feb. 16, 1937

2,071,080

UNITED STATES PATENT OFFICE 2,071,080

ROLLER

James E. Marshall, New Haven, Conn., assignor to Winchester Repeating Arms Company, New Haven, Conn., a corporation of Maryland Application February 28, 1935, Serial No. 8,595

3 Claims. (Cl. 208—181)

This invention relates to rollers and more particularly to a roller suitable for use as a skate roller or the like.

In the present invention I provide a roller formed of a minimum number of parts and that is rugged and capable of withstanding the hard usage to which skate rollers are subjected. More specifically I provide a roller having a single row of ball bearings in which the bearings are so mounted, and the surrounding parts so constructed that the roller will withstand the strains and stresses encountered in use.

The invention includes the provision of ball races that engage the surfaces of the bearings over a relatively large area and these ball races are mounted in shaped recesses in the web of the roller which recesses closely conform to the outer surfaces of the ball race to produce a rigid, strong construction.

Figure 2:
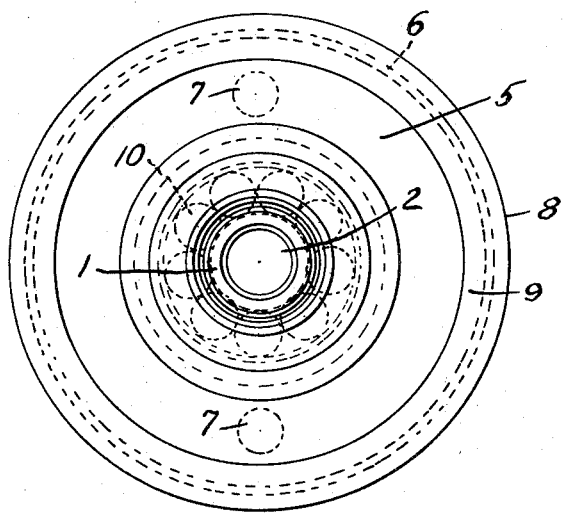

In the accompanying drawing I have shown one form of the invention. In the drawing:

Fig. 1 is a sectional view of a roller constructed in accordance with my invention; and Fig. 2 is a side elevation.

Referring to the drawing the reference numeral 1 designates a tubular support or hub having a central opening 2 for the reception of an axle (not shown). The hub is provided with a pair of spaced annular enlargements 3 and a race-way 4 is formed between these enlargements. The roller proper is formed of a pair of disc-like webs 5 preferably made of sheet metal or the like and each of these webs is provided with a peripheral flange 6. The two webs are secured to each other in any suitable way as by spot welding at spaced points indicated at 7. A tread 8 is arranged over the external flanges of the webs and the edges of the tread are spun or pressed around the outer edges of the flanges as indicated at 9.

A row of bearing members 10 is arranged in the race-way 4. The bearings are contained in ball races 11 of special form to give the completed roller the strength and rigidity normally obtained from a roller having two rows of bearings. The ball races 11 are made of hardened steel or the like and in cross-section closely conformed to the surface of the balls. As shown, the ball races are formed of two members and the inner edges of these members extend beyond the center of the balls as indicated at 12 toward the hub. Thus the balls are not only retained in the race-ways and properly supported to transmit radial shocks but are supported laterally of the roller and produce a more rigid construction. The exterior of the ball races is likewise reinforced by constructing the adjacent portion of the webs so that they closely conform to the outer surface of the ball races as indicated at 13. As shown, the outer periphery of each of the ball races is provided with an outwardly extending flange 14 and beyond the curved portion 13 of the web are shaped to snugly receive the flanges 14 as shown at 15, and securely clamp the two sections of the ball race together.

The provision of ball races in contact with the balls over a surface greater than one-half the circumference of the balls possesses several advantages. Where the contact between the balls and the race ways is substantially a point contact on each side of the center of the balls there is a tendency to score the surface of the race way. This scoring, once started, becomes marked in a very short time resulting in such wear on the ball race and the ball bearings that the roller is soon unfit for further use. The conformity of the adjacent portion of the web with the outer surface of the ball races and flanges 14 securely clamps the two sections of the ball race together and the shoulder formed in the web in surrounding the flanges 14 prevents displacement of the balls and serves to keep the parts properly assembled. A very compact, rigid structure is thus produced.

By means of the construction heretofore described a very rigid and sturdy roller is produced with a single set of bearings. The use of a single set of bearings provides a less expensive construction than when two rows of bearings are employed and at the same time, by means of the features heretofore described, a roller having sufficient strength to withstand rough usage is obtained. The extension of the ball races toward the center hub beyond the center of the ball bearings produces additional surface over which strains and stresses can be transmitted to other parts of the roller and by forming the portions 13 and 15 of the web so that they closely conform to the adjacent outer surface of the ball race the rigid construction and sturdiness is enhanced.

I claim:

1. A roller comprising a hub having a raceway therein, a pair of ball races surrounding said race-way, a row of bearing members mounted between said race-way and said ball races, said ball races closely conforming to the surfaces of said bearing members and extending toward the hub beyond the center of said bearing members, radial flanges formed on said ball races and arranged adjacent each other, a pair of webs comprising intermediate annular portions arranged adjacent to and secured to each other, the inner portions of said webs being shaped to snugly receive said races and said flanges, and a tread member carried by said webs.

2. A roller comprising a hub having a race-way therein, a pair of ball races surrounding said race-way, a row of bearing members mounted between said race-way and said ball races, said ball races closely conforming to the surfaces of said bearing members and extending toward the hub beyond the center of said bearing members, radial flanges formed on said ball races and arranged adjacent each other, a pair of webs comprising intermediate annular portions arranged adjacent to and secured to each other, the inner portions of said webs being shaped to snugly receive said races and said flanges, peripheral flanges formed on said webs and extending in opposite directions, and a tread member carried by said peripheral flanges.

3. A roller comprising a hub having a race-way therein, a pair of ball races surrounding said race-way, a single row of bearing members mounted between said race-way and said ball races, radial flanges formed on said ball races and arranged adjacent each other, and a pair of webs comprising intermediate annular portions arranged adjacent each other, the inner portions of said webs being shaped to snugly receive said races and said flanges.

JAMES E. MARSHALL.